United States Patent
Chang

(10) Patent No.: US 7,070,102 B2
(45) Date of Patent: Jul. 4, 2006

(54) DUAL LIGHT SOURCE VOLTAGE-MODULATED RECIPROCAL CONTROL CIRCUIT FOR SCANNER

(76) Inventor: Chin-Lin Chang, 3F, No. 3, 37 Alley, 152 Lane, 2 Sec., Chung-Hsing Rd., Chulung Chen, Hsinchu Hsien (TW)

( * ) Notice: Subject to any disclaimer, the term of this patent is extended or adjusted under 35 U.S.C. 154(b) by 821 days.

(21) Appl. No.: 09/997,647

(22) Filed: Nov. 27, 2001

(65) Prior Publication Data

US 2003/0099005 A1    May 29, 2003

(51) Int. Cl.
*G06K 7/10* (2006.01)
*G06K 7/14* (2006.01)

(52) U.S. Cl. ........................ 235/454; 235/455
(58) Field of Classification Search ............... 235/454, 235/455; 358/509
See application file for complete search history.

(56) References Cited

U.S. PATENT DOCUMENTS 4,504,951 A * 3/1985 McMahan et al. ....... 372/38.01
5,144,117 A * 9/1992 Hasegawa et al. .......... 235/455

* cited by examiner

*Primary Examiner*—Michael G. Lee
*Assistant Examiner*—Lisa M. Caputo
(74) *Attorney, Agent, or Firm*—Berkeley Law & Technology Group

(57) ABSTRACT

A dual light source voltage-modulated reciprocal control circuit for a scanner. The circuit includes a voltage modulation circuit, a first lamp driving circuit, a second lamp driving circuit and a reciprocal control circuit. The voltage-modulating circuit generates a modulated voltage whose magnitude can be adjusted through pulse width modulation of a square wave. The first lamp driving circuit receives the modulated voltage to drive a first lamp. Similarly, the second lamp driving circuit receives the modulated voltage to drive a second lamp. The reciprocal control circuit redirects the modulated voltage to the first lamp driving circuit or the second lamp driving circuit according to the dictate of a reciprocal logic signal.

23 Claims, 6 Drawing Sheets

Table 1

| F/U LAMP | square SV | back lamp | cover lamp |
|---|---|---|---|
| HIGH | PULSE/HIGH | ON | OFF |
| LOW | PULSE/HIGH | OFF | ON |
| X | LOW | OFF | OFF |

DUAL LIGHT SOURCE VOLTAGE-MODULATED RECIPROCAL CONTROL CIRCUIT FOR SCANNER

BACKGROUND OF THE INVENTION

1. Field of Invention

The present invention relates to a dual light source voltage modulated reciprocal control circuit. More particularly, the present invention relates to a dual light source voltage-modulated reciprocal control circuit for a scanner.

2. Description of Related Art

A scanner requires a light source to conduct a document scanning. In general, a scanner has two sets of lights for document scanning, namely, a set of back lights for scanning of ordinary opaque documents and a set of cover lights for scanning transparent documents.

FIG. 1 is a block diagram showing a dual light source circuit in a conventional scanner. As shown in FIG. 1, square wave signals SV1 and SV2 are transmitted from an application specific integrated circuit 102 to a first voltage-modulated circuit 104 and a second voltage-modulated circuit 106 respectively. Pulse width of the square wave signals SV1 and SV2 can be modulated (for example, within the range 15%~80%). The larger the pulse width of the square wave signals SV1 and SV2, the greater will be the magnitude of the modulated voltages MV1 and MV2 each having a direct current (dc) square wave profile submitted from the first voltage-modulated circuit 104 and the second voltage-modulated circuit 106.

The first voltage-modulated circuit 104 and the second voltage-modulated circuit 106 submit the modulated voltages MV1 and MV2 to a back light driving circuit 108 and a cover light driving circuit 110 respectively. The back light driving circuit 108 and the cover light driving circuit 110 are dc-to-ac inverters capable of converting a direct current (dc) voltage into an alternating (ac) voltage. The back light driving circuit 108 issues an alternating voltage INV1 to a back light 112 and the cover light driving circuit 110 issue an alternating voltage source INV2 to a cover light 114. Hence, either the back light 112 or the cover light 114 is triggered to conduct a document scanning but not both.

However, most conventional scanners having a dual light source circuit employ two sets of voltage-modulating circuits. With the deployment of two voltage-modulating circuits, more area on a printed circuit board is required to house component devices. Ultimately, a greater hardware cost is incurred.

SUMMARY OF THE INVENTION

Accordingly, one object of the present invention is to provide a dual light source voltage-modulated reciprocal control circuit for a scanner that uses just one set of voltage-modulating circuit. With less component devices, area occupation of the control circuit on a printed circuit board is reduced and some hardware cost is saved.

To achieve these and other advantages and in accordance with the purpose of the invention, as embodied and broadly described herein, the invention provides a dual light source voltage-modulated reciprocal control circuit for a scanner. The circuit includes a voltage-modulating circuit, a first lamp driving circuit, a second lamp driving circuit and a reciprocal control circuit. The voltage-modulating circuit generates a modulated voltage whose magnitude can be adjusted through pulse width modulation of a square wave. The first lamp driving circuit receives the modulated voltage to drive a first lamp. Similarly, the second lamp driving circuit receives the modulated voltage to drive a second lamp. The reciprocal control circuit redirects the modulated voltage to the first lamp driving circuit or the second lamp driving circuit according to the dictate of a reciprocal logic signal. With such a circuit design, hardware cost for the circuit is reduced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

Figure 1:
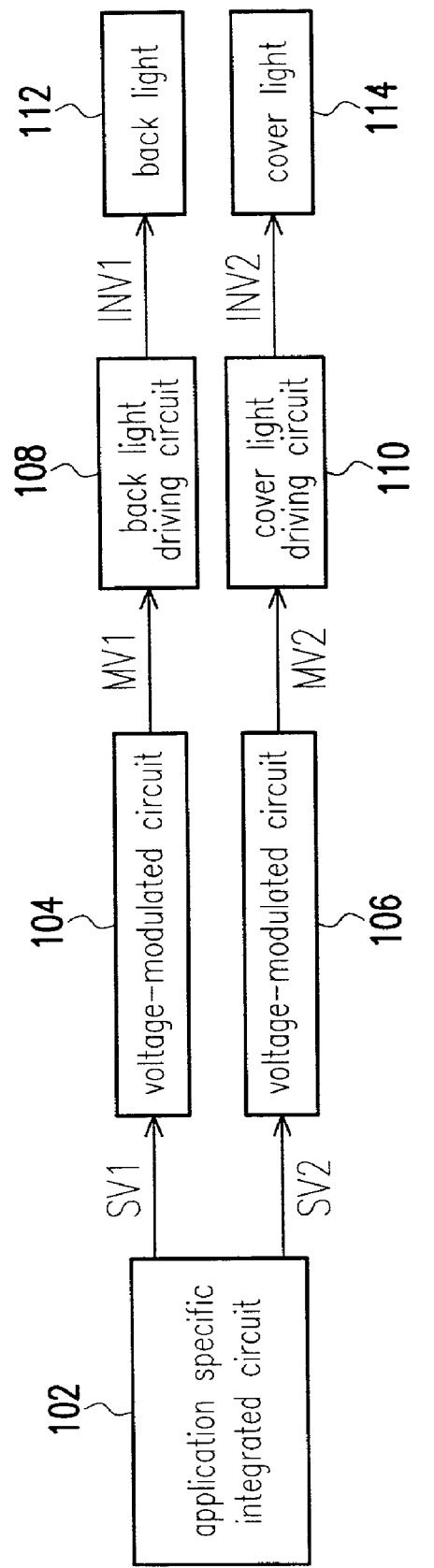
FIG. 1 is a block diagram showing a dual light source circuit in a conventional scanner.

Table 1 shows the logic behind the switching of the light sources according to this invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
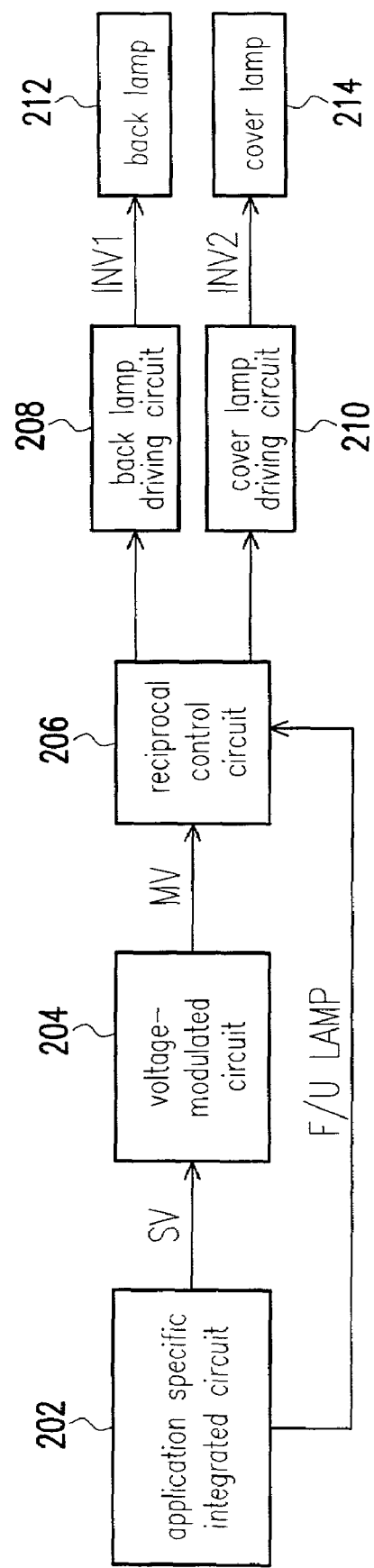
FIG. 2 is a block diagram showing a dual light source voltage-modulated reciprocal control circuit for a scanner according to this invention.

FIG. 2 is a block diagram showing a dual light source voltage-modulated reciprocal control circuit for a scanner according to this invention. As shown in FIG. 2, an application specific integrated circuit 202 outputs a square wave signal SV to a voltage-modulating circuit 204. Pulse width of the square wave signal SV is adjustable. The higher the pulse width of the square wave signal SV, the greater will be the modulated voltage MV having a direct current (dc) profile output from the voltage-modulating circuit 204. Furthermore, the application specific integrated circuit 202 also outputs a reciprocal logic signal F/U LAMP to a reciprocal control circuit 206. The reciprocal logic signal F/U LAMP determines if the modulated voltage MV is sent to a back light driving circuit 208 or a cover light driving circuit 210.

The voltage-modulating circuit 204 outputs the modulated-voltage MV to the reciprocal control circuit 206. The reciprocal control circuit 206 picks up the reciprocal logic signal F/U LAMP from the application specific integrated circuit 202 and sends the modulated voltage MV to the back light driving circuit 208 or the cover light driving circuit 210 respectively. The back light driving circuit 208 and the cover light driving circuit 210 are dc-to-ac inverters capable of converting a direct current (dc) voltage into an alternating (ac) voltage. The back light driving circuit 208 issues an alternating voltage INV1 to a back light 212 and the cover light driving circuit 210 issues an alternating voltage source INV2 to a cover light 214. Hence, either the back light 212 or the cover light 214 is triggered to conduct a document scanning but not both.

Figure 3:
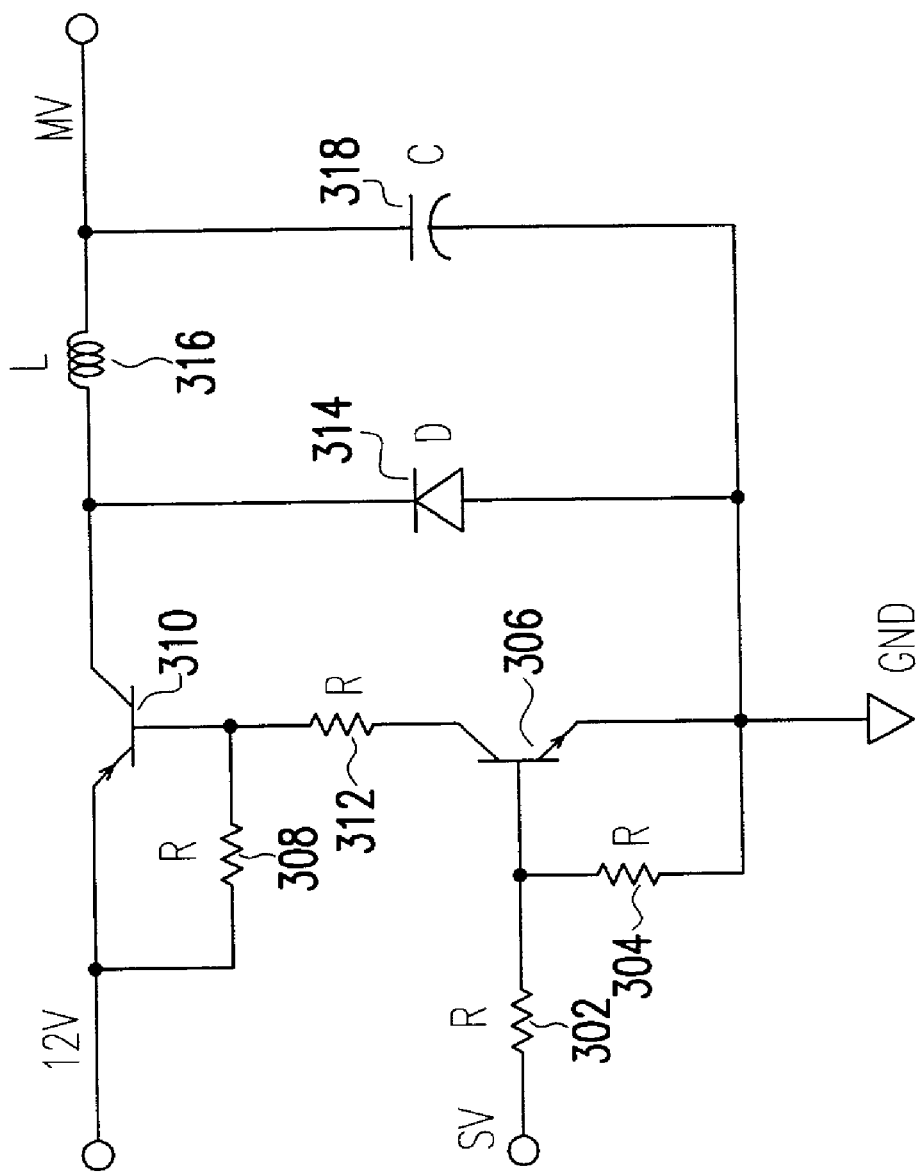
FIG. 3 is a diagram showing a voltage-modulated circuit according to one embodiment of this invention.

FIG. 3 is a diagram showing a voltage-modulated circuit according to one embodiment of this invention. As shown in FIG. 3, a first terminal of a resistor R 302 receives the square wave SV from the application specific integrated circuit 202 (shown in FIG. 2). A first terminal of a resistor R 304 is connected to a second terminal of the resistor R 302 and a second terminal of the resistor R 304 is connected to ground. A first terminal of a resistor R308 is connected to a voltage source at 12V. A first terminal of a resistor R 312 is connected to a second terminal of the resistor R 308. A voltage source terminal of a transistor 306 is connected to a second terminal of the resistor R 312. A control terminal of the transistor 306 is connected to the second terminal of the resistor R 302. A load terminal of the transistor 306 is connected to ground. A voltage terminal of a transistor 310 is connected to a voltage source at 12V. A control terminal of the transistor 310 is connected to a second terminal of the resistor R 308. The anode of a diode D 314 is connected to ground. A first terminal of an inductor L 316 is connected to the loading terminal of the transistor 310. The second terminal of the inductor L 316 is an output terminal for outputting the modulated voltage MV. A first terminal of a capacitor C 318 is connected to the first terminal of the inductor L 316 and the second terminal of the capacitor C 318 is connected to ground.

In FIG. 3, the resistors R 302, 304, 308, 312 and the transistors 310, 306 together constitute a circuit for boosting voltage. Each of the resistors R 302, 304, 308 and 312 has a different resistance value. The inductor L 316 and the capacitor C 318 serve as energy storage devices and the diode D 314 serves as a circuit bypass.

Figure 4:
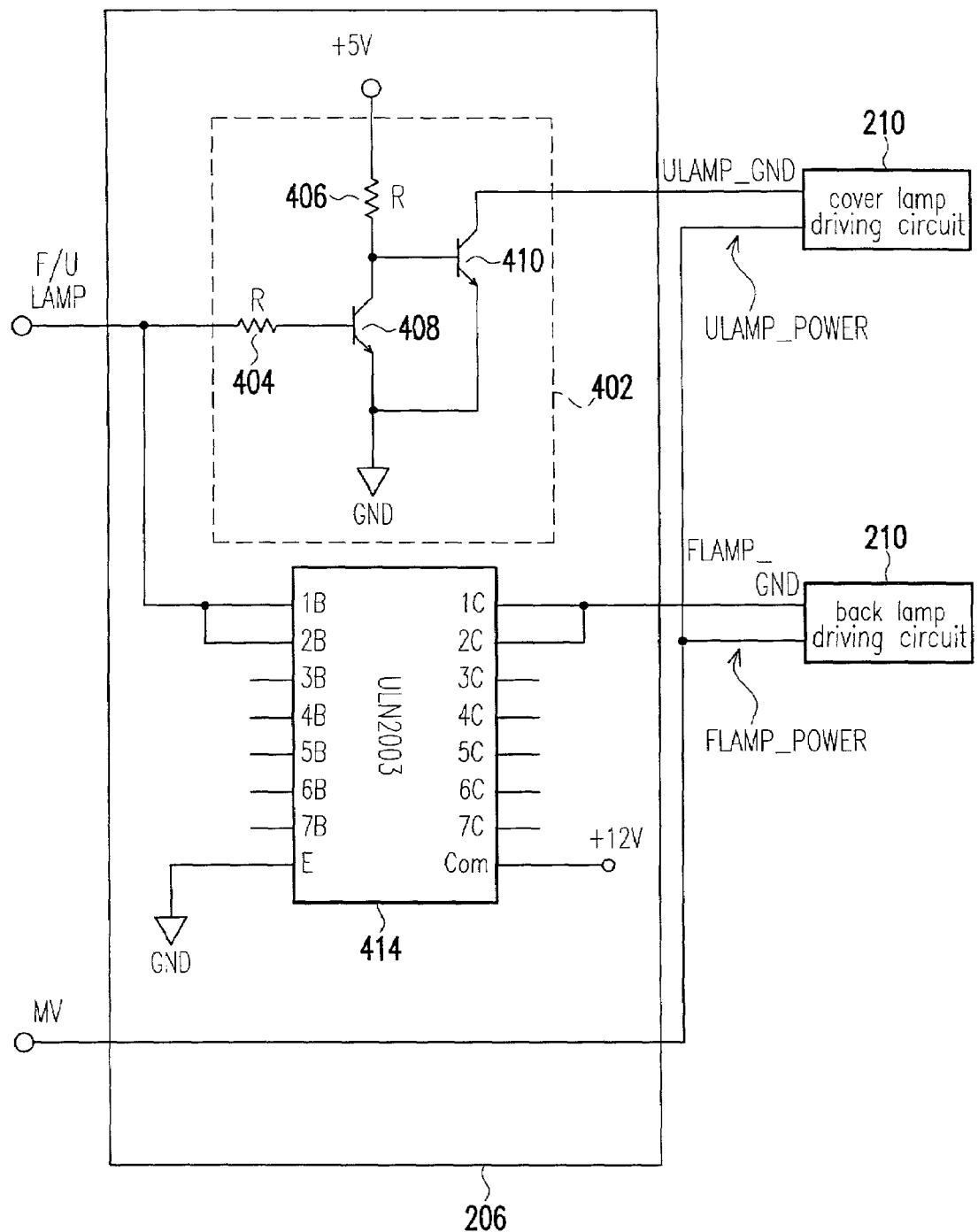
FIG. 4 is a diagram showing a reciprocal control circuit according to one preferred embodiment of this invention.

The reciprocal control circuit 206 (shown in FIG. 2) comprises a common emitter circuit and a Darlington circuit. FIG. 4 is a diagram showing a reciprocal control circuit according to one preferred embodiment of this invention. As shown in FIG. 4, the common emitter circuit 402 includes resistors R 404, R 406 and transistors 408, 410. A first terminal of the resistor R 404 receives the reciprocal logic signal F/U LAMP from the application specific integrated circuit 202. A first terminal of the resistor R 406 is connected to a voltage source at 5V. A source terminal of the transistor 408 is coupled to a second terminal of the resistor R 406. A control terminal of the transistor 408 is coupled to a second terminal of the resistor R 404. A loading terminal of the transistor 408 is connected to ground. A source terminal of the transistor 410 is coupled to a ground terminal ULAMP_GND of the cover lamp driving circuit 210. A control terminal of the transistor 410 is coupled to the second terminal of the resistor R 406. A loading terminal of the transistor 410 is connected to ground. The transistor 410 of the common emitter circuit 402 is designed as a current sink. Hence, current specification of the transistor 410 is especially important.

Input terminals 1B, 2B of the integrated circuit IC ULN2003 414 are connected in parallel to the application specific integrated circuit 202 for receiving the reciprocal logic signal F/U LAMP. Output terminals 1C, 2C are connected in parallel to the earth terminal FLAMP_GND of the back light driving circuit 208. The E terminal of the integrated circuit IC ULN2004 414 is connected to ground. The COM terminal of the integrated circuit IC ULN2004 414 is connected to a voltage source at 12V. After receiving the modulated voltage MV submitted from the application specific integrated circuit 202, the reciprocal control circuit 206 outputs the modulated voltage MV to the source terminal ULAMP_POWER of the cover light driving circuit 210 and the source terminal FLAMP_POWER of the back light driving circuit 208. The resistor R 404 and the resistor R 406 have different resistance values. The integrated circuit IC ULN2003 414 comprises of seven groups of Darlington circuits. The terminals 1B, 2B, 3B, 4B, 5B, 6B, 7B on the integrated circuit IC ULN2003 414 are the input terminals and the terminals 1C, 2C, 3C, 4C, 5C, 6C and 7C on the integrated circuit IC ULN2003 414 are the output terminals of the seven Darlington circuits respectively.

Figure 5:
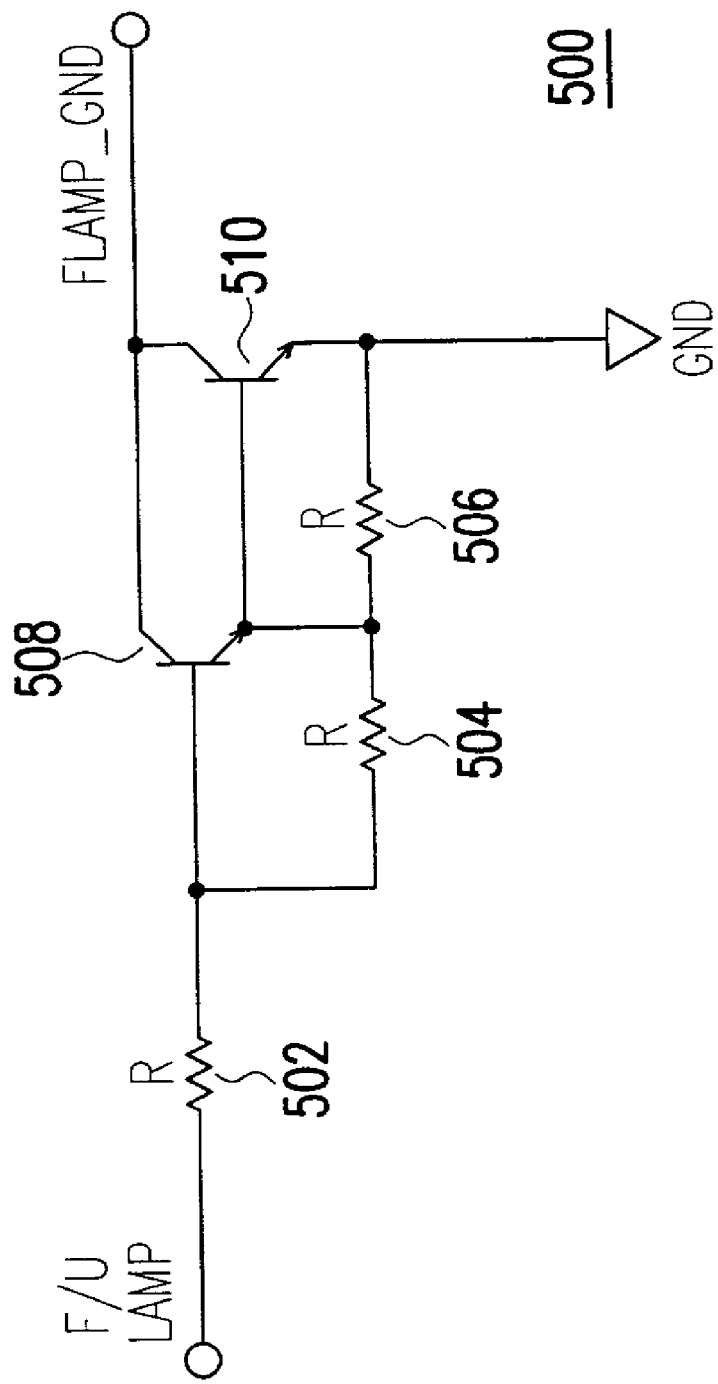
FIG. 5 is a diagram of a Darlington circuit.

FIG. 5 is a diagram of a Darlington circuit. As shown in FIG. 5, the Darlington circuit 500 has a resistor R 502 with a first terminal connected to the application specific integrated circuit 202 for receiving the reciprocal logic signal F/U LAMP. A first terminal of a resistor R 504 is coupled to a second terminal of the resistor R 502. A first terminal of a resistor R 506 is coupled to a second terminal of the resistor R 504. A second terminal of the resistor R 506 is connected to ground. A source terminal of a transistor 508 is connected to the ground terminal FLAMP_GND of the back light driving circuit 208 (refer to FIG. 4). A control terminal of the transistor 508 is coupled to the second terminal of the resistor R 502. A loading terminal of the resistor 508 is coupled to the second terminal of the resistor R 504. A source terminal of a transistor 510 is also coupled to the ground terminal FLAMP_GND of the back light driving circuit 208 (refer to FIG. 4). A control terminal of the transistor 510 is coupled to the second terminal of the resistor R 504. A loading terminal of the transistor 510 is connected to ground. Each of the resistors R 502, 504 and 506 has a different resistance value.

Table 1 shows the logic behind the switching of the light sources according to this invention. Refer also to the circuit diagrams shown in FIGS. 4 and 5. When the reciprocal logic signal F/U LAMP output from the application specific integrated circuit 202 (refer to FIG. 2) is HIGH and the pulse width modulated square wave SV is PULSE/HIGH, the transistor 408 is "ON" and hence the transistor 410 is "OFF". An open circuit is formed between the source terminal ULAMP_POWER of the cover light driving circuit 210 and the ground terminal ULAMP_GND. Thus, the cover lamp 214 (refer to FIG. 2) is "OFF". Similarly, when the reciprocal logic signal F/U LAMP output from the application specific integrated circuit 202 (refer to FIG. 2) is HIGH and the pulse width modulated square wave SV is PULSE/HIGH, the transistor 508 and the transistor 510 are "ON". The source terminal FLAMP_POWER of the back light driving circuit 208 and the ground terminal FLAMP_GND form a conductive path so that the back light driving circuit 208 receives the modulated voltage MV. Thus, the back light lamp 212 (refer to FIG. 2) is "ON".

In like manner, when the reciprocal logic signal F/U LAMP output from the application specific integrated circuit 202 (refer to FIG. 2) is LOW and the pulse width modulated square wave SV is PULSE/HIGH, the transistor 408 is "OFF". The transistor 410 is "ON" so that a conductive path is formed between the source terminal ULAMP_POWER of the cover light driving circuit 210 and the ground terminal ULAMP_GND. The cover lamp driving circuit 210 receives the modulated voltage MV and hence the cover lamp 214 (refer to FIG. 2) is "ON". Similarly, when the reciprocal logic signal F/IU LAMP output from the application specific integrated circuit 202 (refer to FIG. 2) is LOW and the pulse width modulated square wave SV is PULSE/HIGH, the transistor 508 and the transistor 510 are both "OFF". An open circuit is formed between the source terminal FLAMP_POWER of the back light driving circuit 208 and the ground terminal FLAMP_GND. Thus, the back light lamp 212 (refer to FIG. 2) is "OFF".

In Table 1, the dual light source voltage-modulated reciprocal control circuit may operate in an energy-saving mode. This occurs when the pulse width modulated square wave SV output from the application specific integrated circuit 202 (refer to FIG. 2) is LOW. Under such voltage setting, the reciprocal logic signal F/U LAMP from the application specific integrated circuit 202 (refer to FIG. 2) is incapable of triggering the back light 212 or the cover light 214.

In summary, when the reciprocal control circuit picks up reciprocal logic signal from the application specific integrated circuit, the reciprocal control circuit will output a reciprocal logic signal that switches on either the back light or the cover light. Hence, one set of voltage-modulating circuit can provide necessary power for driving the back light and the cover light. In addition, the integrated circuit IC ULN2003 414 used in FIG. 4 is one of the components inside the scanner and hence no additional IC is required. Furthermore, comparing the common emitter circuit 402 and the voltage-modulating circuit shown in FIG. 3, the common emitter circuit 402 has a simpler configuration, requires fewer electronic devices and occupies less printed circuit board area.

Since only one set of voltage modulation circuit is required, the circuit demands fewer electronic devices and occupies a smaller printed circuit board area. Hence some hardware cost is saved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dual light source voltage-modulated reciprocal control circuit for a scanner, comprising:
   a voltage-modulation circuit for generating a modulation voltage whose magnitude may be adjusted according to a square wave having pulse width modulation capacity;
   a first lamp driving circuit for receiving the modulated voltage and driving a first lamp;
   a second lamp driving circuit for receiving the modulated voltage and driving a second lamp; and
   a reciprocal control circuit for sending the modulated voltage to the first lamp driving circuit or the second lamp driving circuit according to the dictate of a reciprocal logic signal.

2. The circuit of claim 1, wherein the first lamp includes a back light.

3. The circuit of claim 1, wherein the second lamp includes a cover light.

4. The circuit of claim 1, wherein the first lamp driving circuit and the second lamp driving circuit are dc-to-ac inverters for converting a direct current source to an alternating current source.

5. The circuit of claim 1, wherein the reciprocal control circuit further includes an application specific integrated circuit.

6. The circuit of claim 1, wherein the reciprocal control circuit comprises a common emitter circuit and a Darlington circuit.

7. The circuit of claim 6, wherein the common emitter circuit further comprising:
   a first resistor having a first terminal for receiving the reciprocal logic signal;
   a second resistor having a first terminal connected to a voltage source;
   a first transistor having a voltage source coupled to a second terminal of the first resistor and a loading terminal coupled to ground; and
   a second transistor having a voltage source coupled to an earth terminal of the second lamp driving circuit, a control terminal coupled to a second terminal of the second resistor and a loading terminal coupled to ground.

8. The circuit of claim 6, wherein the Darlington circuit further comprising:
   a first resistor having a first terminal for receiving the reciprocal logic signal;
   a second resistor having a first terminal coupled to a second terminal of the first resistor;
   a third resistor having a first terminal coupled to a second terminal of the second resistor and a second terminal coupled to ground;
   a first transistor having a voltage terminal coupled to an earth terminal of the first lamp driving circuit, a control terminal coupled to a second terminal of the first resistor and a loading terminal coupled to the second terminal of the second resistor; and
   a second transistor having a voltage terminal coupled to an earth terminal of the first lamp driving circuit, a control terminal coupled to the second terminal of the second resistor and a loading terminal coupled to ground.

9. The circuit of claim 8, wherein the Darlington circuit includes an integrated circuit (IC) having the IC label ULN2003.

10. An apparatus, comprising:
    a dual light source voltage-modulated reciprocal control circuit, comprising:
    a voltage-modulation circuit for generating a modulation voltage;
    a first lamp driving circuit for receiving the modulated voltage and driving a first lamp;
    a second lamp driving circuit for receiving the modulated voltage and driving a second lamp; and
    a reciprocal control circuit for sending the modulated voltage to at least one of the first lamp driving circuit or the second lamp driving circuit.

11. The apparatus of claim 10, wherein the first lamp includes a back light.

12. The apparatus of claim 10, wherein the second lamp includes a cover light.

13. The apparatus of claim 10, wherein the first lamp driving circuit and the second lamp driving circuit comprise dc-to-ac inverters for converting a direct current source to an alternating current source.

14. The apparatus of claim 10, wherein the reciprocal control circuit further includes an application specific integrated circuit.

15. The apparatus of claim 10, wherein the reciprocal control circuit comprises a common emitter circuit and a Darlington circuit.

16. The apparatus of claim 15, wherein the common emitter circuit further comprises:
    a first resistor having a first terminal for receiving the reciprocal logic signal;
    a second resistor having a first terminal connected to a voltage source;

a first transistor having a voltage source coupled to a second terminal of the first resistor and a loading terminal coupled to ground; and a second transistor having a voltage source coupled to an earth terminal of the second lamp driving circuit, a control terminal coupled to a second terminal of the second resistor and a loading terminal coupled to ground.

17. The apparatus of claim 15, wherein the Darlington circuit further comprises:

a first resistor having a first terminal for receiving the reciprocal logic signal;

a second resistor having a first terminal coupled to a second terminal of the first resistor;

a third resistor having a first terminal coupled to a second terminal of the second resistor and a second terminal coupled to ground;

a first transistor having a voltage terminal coupled to an earth terminal of the first lamp driving circuit, a control terminal coupled to a second terminal of the first resistor and a loading terminal coupled to the second terminal of the second resistor; and a second transistor having a voltage terminal coupled to an earth terminal of the first lamp driving circuit, a control terminal coupled to the second terminal of the second resistor and a loading terminal coupled to ground.

18. A method, comprising:

generating a modulation voltage;

receiving the modulated voltage and driving a first lamp;

receiving the modulated voltage and driving a second lamp; and sending the modulated voltage to a first lamp driving circuit or a second lamp driving circuit according to the dictate of a reciprocal logic signal.

19. The method of claim 18, wherein the first lamp includes a back light.

20. The method of claim 18, wherein the second lamp includes a cover light.

21. The method of claim 18, wherein the first lamp driving circuit and the second lamp driving circuit are dc-to-ac inverters for converting a direct current source to an alternating current source.

22. The method of claim 18, wherein the reciprocal control circuit further includes an application specific integrated circuit.

23. The method of claim 18, wherein the reciprocal control circuit comprises a common emitter circuit and a Darlington circuit.

* * * * *